Sept. 10, 1963 W. J. HOFFMAN ET AL 3,103,323
BALLOON TOWING SYSTEM
Filed May 31, 1961

*INVENTORS*
WILLIAM J. HOFFMAN
PAUL A. H. PANKOW
BY
*Allan M. Sutton*
ATTORNEY

United States Patent Office 3,103,323
Patented Sept. 10, 1963

3,103,323
BALLOON TOWING SYSTEM
William J. Hoffman and Paul A. H. Pankow, both of Minneapolis, Minn., assignors to General Mills, Inc., a corporation of Delaware
Filed May 31, 1961, Ser. No. 113,940
5 Claims. (Cl. 244—3)

This invention relates to balloons and more particularly to systems for transporting articles attached to a balloon wherein the balloon is towed by a motor powered aircraft separate from the balloon.

It has previously been shown that loads can be transported by connecting to a balloon a load of greater weight than the lift of the balloon so that the balloon is overloaded, and connecting the balloon in turn to a motor powered aircraft such as a helicopter. The helicopter supplies power to tow the balloon and also to supply additional lift to raise the balloon and attached load above the ground. It has also been proposed previously that balloons with lift greater than or equal to the weight of a load can be pulled or towed by aircraft. In the latter case, however, take-off and landing of the aircraft and balloon is more difficult to control. It is therefore desirable in almost all instances to overload the balloon so that additional lift from the aircraft is required to raise the balloon and load.

According to previous systems for towing balloon-supported loads, wherein additional lift is supplied by a motor powered aircraft, tow lines are connected between the aircraft and the balloon and are so arranged that the helicopter will lift the balloon vertically during takeoff while exerting approximately equal tension on each of the separate tow lines. As forward speed is increased, approximately equal tension on each of the tow cables is maintained by connecting one end of a length of tow cable to the nose of the balloon and connecting the other end of the cable behind the nose of the balloon. A tie line is connected slidably to the tow cable at one end and to the aircraft at the other end.

There have been several problems associated with this prior art towing system. Outstanding among these problems is the tendency for the balloon to ride up behind the towing aircraft as towing speeds increase, thus interfering with control of the aircraft and sometimes endangering the propellers or rotors. A further disadvantage of the previous system is that the balloon will often not track the towing aircraft satisfactorily and will make the flight more difficult to control. Moreover, in prior art systems the balloon at certain speeds tends to become dynamically unstable about a vertical axis and will exhibit a tendency to yaw.

It is therefore an object of the present invention to provide an improved balloon towing system for transporting a load attached to the balloon.

It is another object of the present invention to provide a balloon towing system wherein the balloon will track satisfactorily behind the towing aircraft.

It is still a further object of the present invention to provide an improved balloon towing system wherein the balloon may be towed at various speeds without passing through transitory conditions of dynamic instability.

It is another object of the present invention to provide an improved balloon towing system wherein the balloon is not subject to yaw when it is being towed.

It is still another object of the present invention to provide an improved balloon towing system wherein the balloon has no tendency to ride up behind and endanger the towing aircraft.

It is a still further object of the present invention to provide an improved balloon towing system wherein higher speeds may be achieved and with greater safety than was possible heretofore.

The present invention is directed toward the provision of a balloon towing system wherein the balloon will have no tendency to ride up behind and endanger the towing aircraft, and wherein the balloon exhibits an improved tracking characteristic and will have little if any tendency to yaw throughout normal towing speeds.

Briefly stated, the present invention provides an improved balloon towing system wherein an aerodynamically shaped balloon having a load connected thereto is towed by means of a motor powered aircraft, with the position of the load axially with respect to the balloon, the weight of the load and the relative lengths of the towing means so adjusted that the balloon is maintained at a negative angle of attack throughout the range of normal towing speeds. The towing means include first and second towing means such as cables connected to the balloon near the nose portion thereof. One of the towing means is connected closer to the tail portion of the balloon than the other towing means. Connecting means such as a cable is attached between the aircraft and the free ends of each of the towing cables, and a fastening means is provided to secure the connecting cable to the towing cables and prevent sliding motion between connected portions of the towing and connecting cables.

The invention, together with further objects and advantages thereof, may best be understood by reference to the following description, taken in conjunction with the accompanying drawing, in which.

Figure 1:
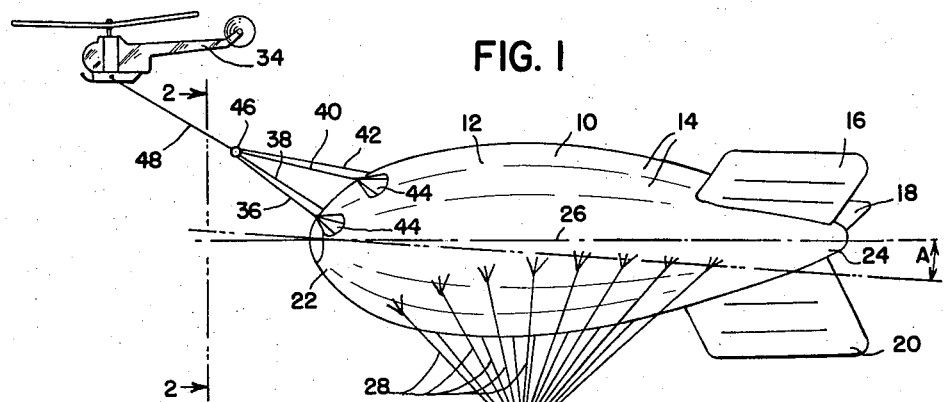
FIGURE 1 is a side elevation showing the improved ballon towing system of the present invention.
Figure 2:
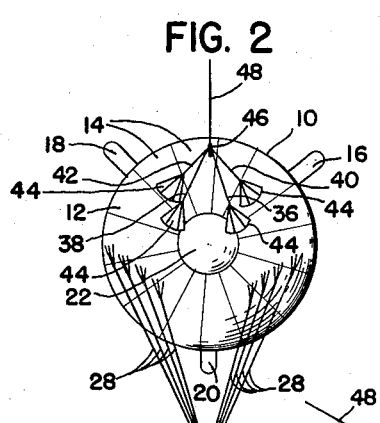
FIGURE 2 is a front elevation of the balloon towing system of FIGURE 1 taken along the line 2—2 of FIGURE 1.

As best seen in FIGURES 1 and 2, the system of the invention includes an elongate balloon 10 having a balloon envelope 12 containing a suitable lifting gas and comprised of a number of tapered gores 14, sealed or secured together in gas tight relationship along their edges. The gores 14 may be made of any suitable flexible, gas impervious material of which polyethylene film is an example, although other balloon envelope materials will be apparent to those skilled in the art. If desired, the envelope 12 may be covered with a non-extensible cloth shroud. The balloon includes a rounded nose portion 22 and a tapered tail portion 24, to which are attached three hollow radially extending fins 16, 18 and 20 formed from the same material as the envelope and filled with either air or a suitable lifting gas. Since it is aerodynamically shaped, the balloon will be subject to a lifting force when traveling through the air in any direction other than along its own axis 26.

Attached to the balloon envelope 12 on a line extending longitudinally along each side are a plurality of harness cables 28 from which a load 30 is supported. The load 30 is connected to the harness cables by a suitable collection device, such as a collection ring 32, and although other collection devices may be used, it is preferred that the collection device be so designed that the load 30 can be moved longitudinally with respect to the balloon 10. An example of means of adjusting the load longitudinally with respect to the balloon is shown in co-pending application, Serial No. 113,953, filed May 31, 1961, by Pankow and Nelson, and assigned to the same assignee as the present application.

Figure 4:
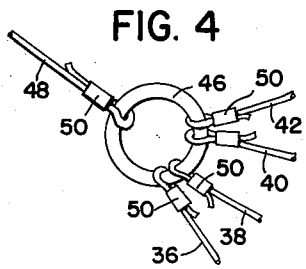
FIGURE 4 is a side elevation of the fastening means connecting together the tow cables and the connecting cable.

A suitable motor-powered aircraft, such as a helicopter 34, is provided to transport the balloon and load. Connected between the helicopter 34 and the balloon 10 is towing means, such as a plurality of tow cable segments 36, 38, 40 and 42 connected to the balloon near its nose portion 22. Cables 40 and 42 are connected to the balloon closer to the tail portion than are cables 36 and 38, with the connection between cables 36 and 38 and the balloon 10 spaced apart circumferentially of the balloon as are the connections between the balloon and the cables 40 and 42. Each of the tow cable segments 36, 38, 40, 42 is attached to the balloon envelope 12 by means of a generally triangularly shaped patch 44 sealed along one edge to the envelope of the balloon and fastened to the cable at the opposite apex. The patches 44 are used to distribute the tension of the cables more widely over the surface of the balloon envelope. The ends of the cable segments 36, 38, 40, 42, nearest the helicopter 34 are connected to fastening means such as a steel ring 46, to which is also connected a cable 48 which extends from the ring 46 to a suitable tow point on the helicopter 34. It will be noticed in FIGURE 4 that the ring 46 fastens the tow cables and connecting cables securely together and fixes permanently the connection point between cables 36, 38, 40, 42 and cable 48, thereby preventing the connecting cable 48 from sliding with respect to the tow cable segments. Each of the cables may be attached to the ring 46 by a suitable cable clamp 50. While a ring type of fastener 46 is preferred to secure the ends of the cables 36, 38, 40, 42, and the cable 48, it is apparent that other suitable fastening means may be used (such as simply tying together the ends of the cables) as long as relative sliding motion between the cables is prevented.

The operation of the towing system according to the present invention may be best explained with reference to FIGURE 3. Lifting gas within the balloon 10 exerts a lifting force, L, on the balloon, while acting against this lifting force is the weight of the payload, P, plus the weight of the balloon itself, W. As previously mentioned, the sum of the payload weight, P, and the weight of the balloon, W, should be somewhat greater than the lift, L, produced by the lifting gas within the envelope, so that the balloon 10 will not have a tendency to rise above the towing aircraft. Before a flight is begun, the axial position of the payload 30 with respect to the balloon 10 and the relative lengths of the cables 36, 38, 40 and 42 are adjusted so as to maintain the balloon at a negative angle of attack A while it is being towed. Because the balloon 10 is maintained at a negative angle of attack, there will exist a downward force, N, on the balloon due to aerodynamic lift in a downward direction caused by the air stream acting against the balloon envelope 12. During flight, the tail fins 16, 18 and 20 exert a small upward lift on the tail portion 24 of the balloon causing a pitching moment, M, about a lateral axis located approximately in the center of the balloon 10. It is apparent that the attack angle A of the balloon should not be so great that the drag is excessive nor so small that there is insufficient negative lift to prevent the balloon from riding up and endangering the helicopter.

A balance of translatory and rotational moments is necessary for equilibrium, and equilibrium is of course necessary to produce a smooth flight. Because equilibrium conditions change as the velocity increases, provision must be made to assure smooth transition from one equilibrium condition to another. The present invention is directed toward this end.

Figure 3:
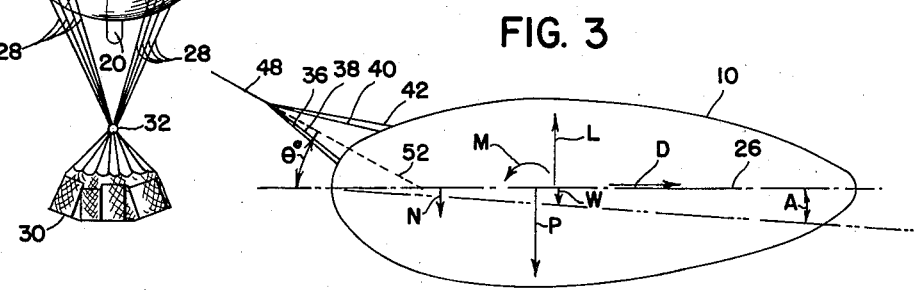
FIGURE 3 is a diagram illustrating the operation of the present invention.

To keep the balloon 10 from passing through transitory states of dynamic instability such as yaw and to prevent the balloon from riding up behind and endangering the helicopter, the angle $\theta$ of the tow line 48 with respect to the axis 26 of the balloon is maintained as nearly constant as possible as the towing speed changes. It may be demonstrated that the tow angle $\theta$ varies as a function of $(W+P+N-L)$, according to the following equation:

$$\text{Tan}^{-1}\theta = \frac{W+P+N-L}{D}$$

wherein W, P and L are constants and D is the aerodynamic drag, as shown in FIG. 3. As D increases with increased velocity, N must also increase to maintain the same angle $\theta$. While the axial position of the payload 30 with respect to the balloon is important in determining the flight characteristics of the balloon, the location of the connection between the tow cables and the balloon is more critical than the position of the load. The best performance occurred in actual flights when the axis 52 of the connecting line 48 intersected the balloon axis 26 at a point approximately one-sixth of the balloon length toward the rear from the nose of the balloon. When the intersection of the axis 52 of the tow line with the axis 26 of the balloon was moved toward the rear an additional ten percent of the total length of the balloon, the desired performance was lost.

When the balloon 10 and payload 30 are lifted by the helicopter 34 during take-off, greater tension will be exerted on tow lines 36 and 38 than on tow lines 40 and 42. Lines 40 and 42 may even become slack during the initial take-off period. As the balloon is towed laterally, the tension on lines 36, 38, 40, 42 will be about equal. In one set of flight conditions it was found that $\theta$ was preferably about 30 degrees when the point of intersection between the axis 52 of the tow line and the balloon axis 26 was located approximately one-sixth of the balloon length behind the nose of the balloon.

It will be noted that the lengths of lines 36, 38, 40 and 42 are not critical so long as the axis 52 of the tow line, when the lines 36, 38, 40 and 42 are taut, intersects the axis 26 of the balloon at the desired angle at a point approximately one-sixth of the distance behind the nose along the axis 26.

The present invention thus provides a balloon towing system wherein loads may be carried with improved stability and wherein the balloon is not subject to yaw or to riding up behind and endangering the towing aircraft. In flight tests it was found that the transition from a vertical lifting to a lateral towing condition could be accomplished with no difficulty.

It is apparent that various adaptations and modifications may be made by one skilled in the art. Therefore, the invention is to be defined only by the scope and spirit of the appended claims.

What we claim as new and desire to secure by Letters Patent of the United States is:

1. In a system for towing a balloon by means of an aircraft, wherein the weight of a load carried by the balloon is greater than the lifting power of the balloon, the combination comprising first towing means connected to the upper side of said balloon near the nose portion thereof, second towing means connected to the upper side of said balloon closer to the tail portion thereof than said first towing means, and elongate towing means connected between the aircraft and said first and second towing means, the relative lengths of said first and second towing means and the point of attachment of said means to the balloon being fixed to maintain a point of intersection between the axes of said elongate towing means and said balloon approximately one-sixth of the length of said balloon behind the nose thereof, the angle formed by the intersection of said axes being approximately 30°.

2. In a system for towing a balloon by means of an aircraft, wherein the weight of a load carried by the balloon is greater than the lifting power of the balloon, the combination comprising first towing means connected to the upper side of said balloon near the nose portion thereof, second towing means connected to the upper side of said balloon closer to the tail portion thereof than said first towing means, and elongate towing means connected between the aircraft and said first and second towing means, the axial position of said load, the weight of said load, the point of attachment of the first and second towing means to the balloon, and the relative lengths of said first and second towing means being such as to maintain said balloon at a negative angle of attack during lateral flight and to maintain a point of intersection between the axes of said elongate towing means and said balloon approximately one-sixth of the length of said balloon behind the nose thereof.

3. A balloon towing system comprising an elongate aerodynamically shaped balloon having a nose portion and a tail portion, a load suspended beneath said balloon with the weight of said load being greater than the lift of said balloon, first elongate towing means connected to the upper side of said balloon near said nose portion, second elongate towing means connected to the upper side of said balloon at a point closer to said tail portion than the point of attachment of said first towing means, connecting means attached between an aircraft for towing said balloon and the ends of said first and second elongate towing means remote from said balloon, fastening means operatively associated with said towing means and said connecting means for preventing relative sliding motion between connected portions of said first and second elongate towing means and said connecting means, the axial position of said load, the weight of said load and the relative lengths of said first and second elongate towing means being adjusted to maintain said balloon at a negative angle of attack and to maintain a point of intersection between the axis of said balloon and a line extending from the aircraft through said fastening means approximately one-sixth of the length of said balloon behind the nose along the axis of said balloon, whereby the aircraft is adapted to tow said balloon at various speeds without passing through transitory conditions of dynamic instability.

4. A balloon towing system comprising an elongate aerodynamically shaped balloon having a nose portion and a tail portion, a load suspended beneath said balloon with the weight of said load being greater than the lift of said balloon, a plurality of tow cable segments connected to the upper side of said balloon near said nose portion and including at least one cable segment connected to said balloon at a point closer to said tail portion than the remaining cable segments, connecting means secured between an aircraft for towing said balloon and the ends of said cable segments remote from said balloon, means fixing the point of attachment of said connecting means to said tow cable segments for preventing relative sliding motion between said cable segments and said connecting means, the weight of said load, the position of said load axially with respect to said balloon, the point of attachment of said tow cable segments to the balloon and the relative lengths of said tow cable segments being so adjusted that said balloon is maintained at a negative angle of attack throughout normal towing speeds, whereby a line extending from the aircraft through said point of attachment between said connecting means and said tow cable segments intersects the axis of said balloon at a substantially constant angle throughout the course of flight.

5. An aerodynamically shaped balloon having a nose portion and a tail portion, a load suspended beneath said balloon with the weight of said load being greater than the lift of said balloon, a first plurality of tow cable segments connected to the upper side of said balloon near the nose portion thereof, at least some of the points of attachment of said first plurality of tow cable segments to said balloon being spaced apart circumferentially on said balloon, a second plurality of tow cable segments connected to the upper side of said balloon and positioned closer to said tail portion than said first plurality of cable segments, at least some of the points of attachment of said second plurality of cable segments to said balloon being spaced apart circumferentially on said balloon, a connecting cable attached at one end to an aircraft for towing said balloon and at the other end to the unattached ends of said tow cable segments, fastening means connected to said connecting cable and said tow cable segments at the point of attachment between said tow cable segments and said connecting cable to prevent relative sliding movement between connected portions of said connecting cable and said tow cable segments, the relative length of said first and second tow cable segments, the weight and position of said load axially with respect to said balloon being so adjusted that said balloon is maintained at a negative angle of attack and is disposed below and behind the aircraft when said balloon is being towed.

References Cited in the file of this patent
UNITED STATES PATENTS

| | | |
|---|---|---|
| 2,398,744 | Jalbert | Apr. 16, 1946 |
| 3,015,456 | Deisinger | Jan. 2, 1962 |
| 3,017,138 | Flint | Jan. 16, 1962 |